Patented Oct. 4, 1927.

1,643,951

UNITED STATES PATENT OFFICE.

ALBERT LEO, OF CHICAGO, ILLINOIS.

FOOD COMPOSITION.

No Drawing. Application filed February 1, 1926. Serial No. 85,384.

This invention relates to a food composition and more particularly to a composition containing albumen and a soluble pectin jelly preparation for making meringues, marshmallows and the like.

Heretofore in making meringues albumen has been used almost exclusively, the usual method being to beat up egg albumen until a great mass of air has been incorporated within the albumen films. Formerly the whites of fresh eggs were used to supply the albumen, but of late years dried egg albumen has been used commercially. In using the dry albumen it is necessary to add sufficient water to restore the albumen to its original state. As a consequence of the introduction of dry albumen, a great many preparations have been placed on the market including albumen in a greater or less amount, each preparation serving its purpose, but all of them entirely dependent upon the albumen to produce the whip effect. Most of the preparations contain approximately 50% egg albumen and are used in a recipe of which the following is representative:

One pint of water.

Two and one half ounces of albumen preparation.

One and one half pounds of sugar.

The albumen produces the whip effect desired.

One of the undesirable properties of egg albumen is that it produces an unstable whip. After being whipped to a froth and allowed to stand for 36 hours, meringue whips containing egg albumen tend to lose their whipped qualities and go back to fluid condition, thus rendering the whip worthless.

It is therefore an object of this invention to provide a food composition for use in making meringues, marshmallows and the like which will produce a stable whip and which will materially reduce the present cost of making meringues, marshmallows and the like.

It is a further object of this invention to incorporate soluble pectin or a pectin containing substance into a food composition for making meringues, marshmallows and the like which will make it possible to substantially reduce the albumen content in compositions of this nature and which will render the whips prepared for making into meringues, marshmallows and the like more stable.

It is a further object of this invention to incorporate into meringue compositions a jelly preparation comprising pectin, sugar, an acid, and a neutralizing agent for a part of said acid adapted to produce a gas therewith during the preparation of the meringue whip, thereby increasing the ease with which the whip is made and the volume of the finished whip.

Other and further objects of this invention will be apparent from the following description and the appended claims.

I have found that a jelly preparation of pectin, a fruit acid and a suitable carbonate, such as described in my copending application entitled "Soluble gum composition", Serial No. 44,360, filed July 17, 1925, may be incorporated with improved results into an albumen composition for making meringues, marshmallows and the like. The jelly preparation by itself can not be beaten into a froth, but when used with an albumen composition greatly increases the normal volume of whip produced by the albumen composition alone. For instance, I have found that by beating a small amount of egg albumen to a froth and then pouring into it gradually a jelly preparation of the above ingredients in proper proportions, I can greatly enlarge the mass of the whip and finally produce a whip that is both satisfactory and stable.

I have also found that by incorporating all of the ingredients in a dry form, with the exception of a part of the total amount of sugar required, I can prepare a compound that gives excellent results. This compound comprises a small proportion of dried egg or blood albumen with some powdered or finely divided sugar or dextrose, a pectin containing substance, a fruit acid and a weakly alkaline salt adapted to neutralize a part of the acid and to produce a gas therewith.

My preferred composition for making meringues is as follows:

| | Per cent. |
|---|---|
| Dried egg albumen | 20 |
| Pectin | 5 |
| Citric acid | 3 |
| Sodium bicarbonate | 2 |
| Dextrose | 70 |
| | 100 |

Since the jellying power of pectin varies considerably I have adopted a standardized pectin, one pound of which is capable of jellying 80 pounds of sugar. Either citrus or apple pectin may be used, and in place of citric acid other fruit acids such as malic and tartaric acid, or dilute edible acids such as phosphoric, or acid reacting salts of harmless character, will serve the purpose, although I prefer to use citric acid.

The method of preparing the whip is substantially as follows:

To one pint of cold water in the whipping bowl I add 2½ ounces, approximately, of the above composition mixture and whip until a stiff froth is produced. I then add 1½ lbs. of sugar and continue beating until the sugar is thoroughly dissolved or incorporated throughout the mass. The whip thus produced is stiff for an almost indefinite length of time and is much bulkier than a whip produced from a straight albumen composition not containing any jelly preparation.

It is obvious that the generation of gas during the whipping process by the reaction between the sodium bicarbonate and the acid will greatly reduce the time necessary for beating as well as increase the volume of the whip and its light, frothy quality. An acid reaction at the end is necessary to render the pectin soluble. Any acid reacting substance of harmless character and adapted to liberate carbon dioxide from the bicarbonate may be used with generally satisfactory results.

I am aware that many changes may be made and numerous details of the process may be varied through a wide range without departing from the principles of this invention and I therefore do not purpose limiting the patent granted hereon otherwise than necessitated by the prior art.

I claim as my invention:

1. A food composition for use in making marshmallows, meringues and the like, comprising albumen, pectin, sodium bicarbonate and a fruit acid adapted to react with said bicarbonate with the formation of a gas.

2. A food composition for use in making meringues, marshmallows and the like, comprising dried egg albumen, pectin, sodium bicarbonate and a powdered fruit acid adapted to react with said bicarbonate with the formation of a gas.

3. A food composition for use in making meringues, marshmallows and the like, comprising albumen, pectin, sodium bicarbonate and citric acid.

4. A food composition for use in making meringues, marshmallows and the like, comprising albumen, citrus pectin, sodium bicarbonate and a fruit acid adapted to react with said bicarbonate with the formation of a gas.

5. A meringue composition containing less than 50% of dried egg albumen and a soluble jelly preparation comprising pectin, an edible fruit acid and a weakly alkaline salt adapted to form in solution a gas with said acid.

6. A food composition for use in making meringues and the like, comprising albumen, pectin, a carbonate and an acid reacting substance adapted in solution to liberate carbon dioxide gas from the carbonate.

In testimony whereof I have hereunto subscribed my name.

ALBERT LEO.